No. 713,896. Patented Nov. 18, 1902.
P. J. A. MAIGNEN.
SYSTEM OF PURIFYING MUNICIPAL WATER SUPPLIES.
(Application filed Oct. 2, 1901.)
(No Model.) 3 Sheets—Sheet 1.
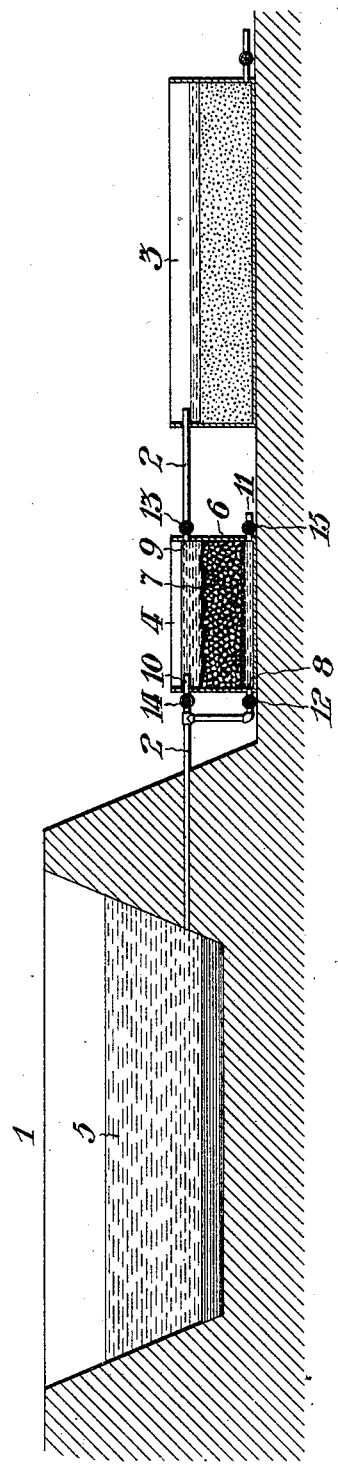
FIG. I
WITNESSES:
Clifton C. Hallowell
John E. Bergner
INVENTOR:
P. J. A. MAIGNEN.
by Arthur E. Paige
Atty.

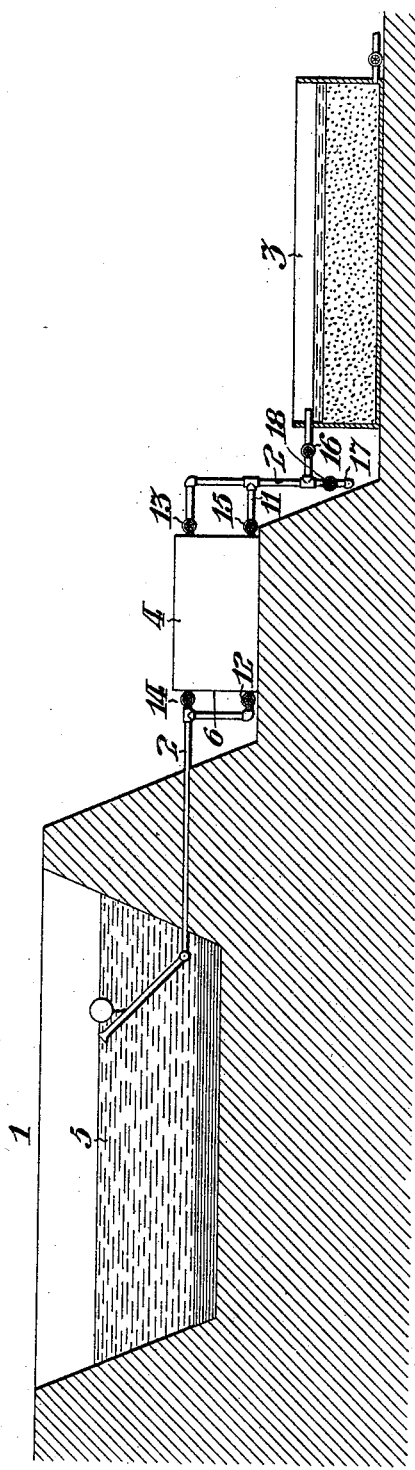

No. 713,896. Patented Nov. 18, 1902.
P. J. A. MAIGNEN.
SYSTEM OF PURIFYING MUNICIPAL WATER SUPPLIES.
(Application filed Oct. 2, 1901.)
(No Model.) 3 Sheets—Sheet 3.
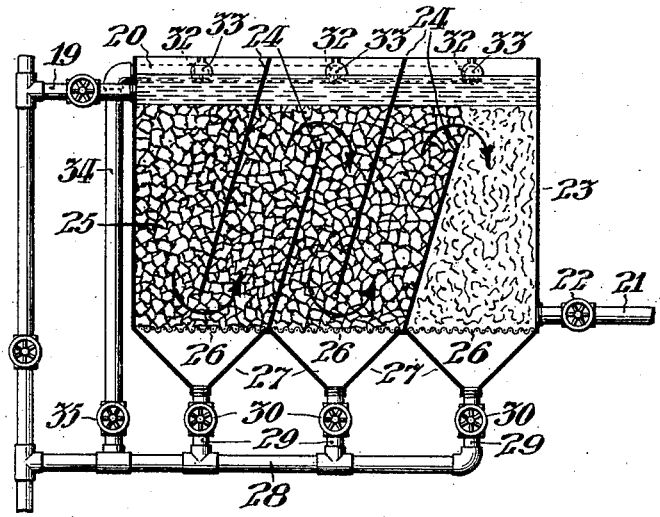
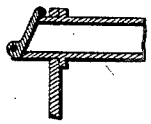
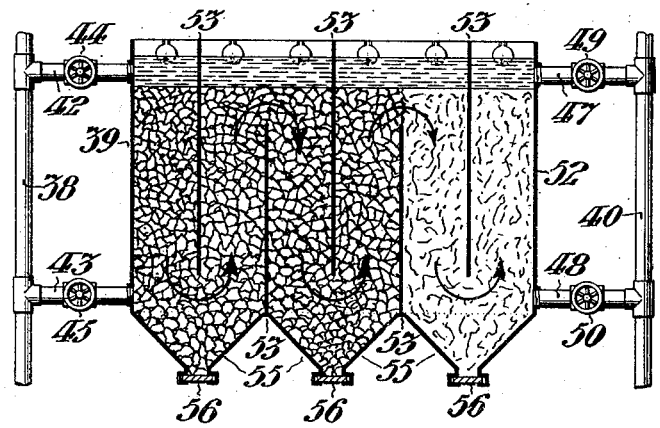
WITNESSES:
Clifton C. Hallowell
John C. Bergner
INVENTOR:
P. J. A. MAIGNEN,
by Arthur E. Paige
Atty.

UNITED STATES PATENT OFFICE.

PROSPER JEAN AUGUSTE MAIGNEN, OF PHILADELPHIA, PENNSYLVANIA.

SYSTEM OF PURIFYING MUNICIPAL WATER-SUPPLIES.

SPECIFICATION forming part of Letters Patent No. 713,896, dated November 18, 1902.

Application filed October 2, 1901. Serial No. 77,327. (No model.)

*To all whom it may concern:*

Be it known that I, PROSPER JEAN AUGUSTE MAIGNEN, of Philadelphia, in the State of Pennsylvania, have invented certain new and useful Improvements in Systems of Purifying Municipal Water-Supplies, whereof the following is a specification, reference being had to the accompanying drawings.

Hitherto it has been usual to purify large water-supplies by allowing the bulk of suspended matter to settle in sedimentation basins or reservoirs and then conveying the supernatant water directly to a filter-bed, which completes the purification.

It has been found in practice that the old system aforesaid is impracticable for the treatment of water containing a large quantity of suspended matter, such as that found in the rivers Schuylkill and Potomac during freshets, for the reason that mere sedimentation does not remove sufficient of the suspended matter to fit the water for introduction to the filter, and consequently the latter is either quickly choked and rendered inoperative by the deposit of sediment on its surface or the suspended matter, including the bacteria, is discharged directly through the filter. The area of sedimentation basins or reservoirs being practically limited, the difficulty aforesaid cannot be obviated by increasing the capacity of the basins, and the only expedient hitherto devised to maintain the old system in practical operation is that of renewing the surface of the filter at short intervals, which of course largely increases the cost of purification beyond that which would result if the water were properly prepared before application to the filter. The aforesaid increase in the cost of purification of water by the old systems aforesaid is three-fold, as follows: first, the cost of labor and material directly expended to effect the renewal; second, the waste of the filtrate, it being well known that the initial issue of water following the cleaning of the filter must be rejected because of its impurity due to the disturbances of the filtering material incident to the cleaning operation; third, the bacterial efficiency of the filter is materially lessened by its disturbance, it being well known that the bacterial efficiency of a filter increases with the length of time that the filter has remained undisturbed.

I have found that the ordinary sedimentation-basin may be utilized in connection with a sand filter of either the slow or rapid sort or any other form of a filter and the life of the filter maintained to an economical extent and the bacterial result improved by interposing between the basin and the filter an apparatus which I shall hereinafter term a "scrubber," it being characteristic of such apparatus that it removes the bulk of the suspended matter carried by the water passing through it from the sedimentation-basin to the filter without interrupting the continuous flow of the water. Apparatus adapted for the peculiar use specified forms the subject-matter of Letters Patent of the United States No. 661,316, granted to me under date of November 6, 1900. Such apparatus in the present combination effects a result materially different from that secured by either the use of the sedimentation-basin or filter alone or by the simple combination of the basin with the filter, the effect of the scrubber upon the combination as a whole being evident in the increase in life and average efficiency of the filter and in the very material reduction in the cost of the filtrate. For instance, I have found in practice with the improved system aforesaid that a filter which when used alone or merely in combination with a sedimentation-basin required to be renewed at intervals of ten or fifteen days, when employed in combination with a scrubber can be operated at its full capacity for a period ranging from forty-five to sixty days.

In the accompanying drawings, Figure I shows a typical embodiment of my invention. Fig. II is a view similar to Fig. I, but showing a modified arrangement. Figs. III and IV are vertical sectional views of convenient forms of scrubbers. Fig. V is a fragmentary sectional view showing the construction of one of the wash-outlet valves. Fig. VI is a fragmentary plan view showing the removable relation of the baffle-plates with respect to the casing.

Referring to Fig. I, the sedimentation basin or reservoir 1 is provided with the outlet-conduit 2, leading to the filter-bed 3, and interposed between said basin 1 and said bed 3 is the scrubber 4, arranged to receive the direct flow of the water 5 from the basin 1 to the filter 3. Said scrubber 4 comprises an exterior casing 6, comprising a plurality of impedimentors 7, interposed between the inlet 8 and outlet 9 and so arranged as to arrest the bulk of suspended matter without interrupting the continuous flow of the water. Said impedimentors 7 may consist of fragments of ceramic, as indicated at the left-hand side of Figs. III and IV, or may consist of loose masses of porous elastic material, such as wood fibers, as indicated at the right-hand side of said figures, or said two materials may be used in combination, as indicated. It is to be noted, however, that the interstices of the impedimentors are of such size as to permit the free passage of the water without interrupting its continuous flow from said sedimentation-basin to the filter.

In the form of scrubber shown in Fig. I the normal flow of the water from the sedimentation-basin to the filtrate is from the inlet 8 to the outlet 9, and the sediment deposited in the mass of impedimentors 7 by the normal flow of the water, as aforesaid, may be conveniently removed by passing a current of water through the scrubber in the direction opposite to the normal direction of flow. In order that said washing operation may be conveniently effected, I provide the conduit 2 with a branch 10 at the top of the casing 6 and provide the latter with a waste-outlet 11 at its bottom. The inlet 8 and outlet 9 being respectively provided with valves 12 and 13 and the branch inlet 10 and waste-outlet 11 being respectively provided with valves 14 and 15, the water may be caused to flow at the will of the operator either from the bottom inlet 8 to the top outlet 9 or from the top inlet 10 to the bottom outlet 11, or if it becomes necessary to deliver the water directly from the sedimentation-basin to the filter such result can be secured by opening both the valves 13 and 14.

In the form of my invention shown in Fig. I the scrubber 4 is arranged upon the same level as the filter 3. However, under some circumstances I find it convenient to locate the filter 3 on a level below that of the scrubber 4, as indicated in Fig. II. In said figure I have shown a modified arrangement of the conduits wherein the outlet 11 connects with the pipe 2, controlled by the valve 16, leading to the filter 3, and provided with the outlet branch 17, controlled by the valve 18. By manipulation of said valves it is possible to send the water from the sedimentation-basin 1 through the scrubber 4 either from the bottom to the top or from the top to the bottom of the casing 6 and to deliver the water either directly to the filter or through the waste branch 17.

In the form of scrubber shown in Fig. III the conduit 19 leads from the sedimentation-basin to the scrubber 20 and the conduit 21 leads from the scrubber 20 to the filter. Said scrubber comprises the casing 23, in which are baffle-plates 24, which may be either fixed or movable and arranged so that the normal course of the water is from the inlet 19 to the outlet 21. The water being compelled to take the tortuous path indicated by the arrows deposits the bulk of its suspended matter in the mass of impedimentors 25. I find it convenient to support said impedimentors 25 upon the foraminous floors 26 above the hoppers 27, in which the sediment collects prior to its removal. Said hoppers 27 are connected with the waste-pipe 28 by branches 29, controlled by respective valves 30. I also provide waste-outlets 32, controlled by valves 33 at the top of the casing 23, which outlets are in communication with the pipe 34, leading to the waste-pipe 28 and controlled by the valve 35.

The arrangement above described is such that the scrubber 20 may be cleaned without interrupting the flow of water through it. For instance, by opening any one of the valves 30 a portion of the water flowing from the inlet 19 toward the outlet 21 is diverted through the respective branch 29 to the waste-pipe 28 and washes down the sediment deposited within the impedimentors overlying the respective hopper 27, or by partially closing the valve 22 in the pipe 21 the sediment deposited upon the top of the impedimentors may be washed out with the rising water through the waste-pipe 32 by opening any one of the valves 33 leading thereto.

In the form of my invention shown in Fig. IV the pipe 38 leads from the sedimentation-basin to the scrubber 39 and the pipe 40 leads from said scrubber 39 to the filter. Said pipe 38 is provided with branches 42 43, respectively controlled by valves 44 45, and the pipe 40 is provided with branches 47 48, respectively controlled by valves 49 50, so that the course of the water through the scrubber may be varied at the will of the operator by manipulation of said valves. The scrubber-casing 52 is provided with baffle-plates 53, which may be either fixed or movable and arranged so that the normal course of the water is that indicated by the arrows. In this form of my invention portions of the mass of impedimentors within the casing 52 may be removed and replaced without interrupting the operation of the scrubber. Said impedimentors being divided into three portions, respectively, upheld by the hoppers 55, provided with slide-gates 56, the latter may be independently operated to separately discharge the particular portion of impedimentors supported thereby.

It is to be noted that each of the forms of scrubber above described may be controlled independently of the filter to give any desired degree of preparedness to the water before its delivery to the filter.

I do not desire to limit myself to the precise construction and arrangement which I have illustrated, as it is obvious that various modifications may be made therein in accordance with the nature of the water to be treated without departing from the essential features of my invention.

I claim—

1. In a system for purifying large water-supplies; the combination with a settling-basin; of a scrubber and a granular-bed filter; conduits connecting said basin, said scrubber and said filter in series relation, arranged to discharge the water from said basin to said filter through said scrubber; a mass of impedimentors in said scrubber, having interstices of such size as to permit the free passage of the water without interrupting its continuous flow; said impedimentors being arranged to permit the water to flow directly from the bottom to the top thereof, substantially as set forth.

2. In a system for purifying large water-supplies; the combination with a settling-basin; of a scrubber and a granular-bed filter; conduits connecting said basin, said scrubber and said filter in series relation, arranged to discharge the water from said basin to said filter through said scrubber; a mass of impedimentors in said scrubber having interstices of such size as to permit the free passage of the water without interrupting its continuous flow; said impedimentors being arranged to permit the water to flow directly from the bottom to the top thereof; and, a layer of elastic material at the discharge-surface of said mass of impedimentors, substantially as set forth.

3. In a system for purifying large water-supplies; the combination with a granular-bed filter; of a scrubber; conduits connecting said scrubber and said filter in series relation, arranged to discharge the water from said basin to said filter through said scrubber; a mass of impedimentors in said scrubber having interstices of such size as to permit the free passage of the water without interrupting its continuous flow; said impedimentors being arranged to permit the water to flow directly from the bottom to the top thereof; and means to reverse the direction of flow of water, to wash said impedimentors, substantially as set forth.

In testimony whereof I have hereunto signed my name, at Philadelphia, Pennsylvania, this 21st day of September, 1901.

PROSPER JEAN AUGUSTE MAIGNEN.

Witnesses:
 ARTHUR E. PAIGE,
 MILDRED BARNHART.